(12) United States Patent
Hiatt

(10) Patent No.: US 9,696,232 B2
(45) Date of Patent: Jul. 4, 2017

(54) SYSTEMS AND METHODS FOR TRACK AND BALANCE VISUALIZATION

(71) Applicant: Simmonds Precision Products, Inc., Vergennes, VT (US)

(72) Inventor: Daniel Hiatt, S. Burlington, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 576 days.

(21) Appl. No.: 14/168,445

(22) Filed: Jan. 30, 2014

(65) Prior Publication Data

US 2015/0112637 A1 Apr. 23, 2015

Related U.S. Application Data

(60) Provisional application No. 61/888,748, filed on Oct. 9, 2013.

(51) Int. Cl.
| | | |
|---|---|---|
| *G01M 1/28* | (2006.01) | |
| *B64C 27/00* | (2006.01) | |
| *B64D 43/00* | (2006.01) | |
| *B64F 5/60* | (2017.01) | |

(52) U.S. Cl.
CPC .............. *G01M 1/28* (2013.01); *B64C 27/008* (2013.01); *B64D 43/00* (2013.01); *B64F 5/60* (2017.01)

(58) Field of Classification Search
CPC ........ G01M 1/28; B64D 43/00; B64C 27/008; B64F 5/0045
See application file for complete search history.

(56) References Cited

U.S. PATENT DOCUMENTS

| | | | | |
|---|---|---|---|---|
| 4,887,087 A | * | 12/1989 | Clearwater | ............ G01B 17/04 342/127 |
| 6,567,757 B2 | | 5/2003 | Bechhoefer et al. | |
| 6,574,572 B2 | | 6/2003 | Bechhoefer | |
| 6,950,763 B1 | | 9/2005 | Bechhoefer | |
| 7,272,513 B2 | | 9/2007 | Bechhoefer | |
| 7,512,463 B1 | | 3/2009 | Bechhoefer | |
| 2009/0088922 A1 | * | 4/2009 | Mesec | ................... B64C 27/008 702/58 |
| 2011/0191040 A1 | * | 8/2011 | Bechhoefer | ........... B64C 27/008 702/56 |

FOREIGN PATENT DOCUMENTS

EP 1228960 A1 8/2002

OTHER PUBLICATIONS

Bechhoefer et al., *IMD HUMS Rotor Track and Balance Techniques*, Aerospace Conference 2003 Proceedings, 2003 IEEE, vol. 7, Mar. 8-15, 2003, pp. 3205-3211. ISBN 0-78037651-X/03.

(Continued)

*Primary Examiner* — Mohamed Charioui
*Assistant Examiner* — Jeremy Delozier
(74) *Attorney, Agent, or Firm* — Locke Lord LLP; Scott D. Wofsy; Christopher J. Cillié

(57) ABSTRACT

A method of visualizing track and balance performance includes receiving data indicating track and balance of a rotary blade and receiving a constraint. A first performance level based on the data is determined. A second performance level based on the data and the constraint is determined. The first and second performance levels are displayed on a display unit for visualizing differences between the first and second performance levels.

16 Claims, 5 Drawing Sheets

(56) References Cited

OTHER PUBLICATIONS

Ventres S et al: "Rotor Tuning Using Vibration Data Only", International Annual Forum of the American Helicopter Society, XX, XX, vol. 1, May 1, 2000 (May 1, 2000), pp. 623-629, XP001011843, pp. 626-628; figures 4-10.
Eric Bechhoefer et al: "Improved rotor track and balance performance using an expert system", Prognostics and Health Management (PHM), 2011 IEEE Conference on, IEEE, Jun. 20, 2011 (Jun. 20, 2011), pp. 1-8, XPO31940535, DOI: 10.1109/ICPHM.2011. 6024337, ISBN: 978-1-4244-9828-4, III. RTB Algorithms, IV. Expert System for RTB.
Miller et al: "A comparison of main rotor smoothing adjustments using linear and neural network algorithms", Journal of Sound & Vibration, London, GB, vol. 311, No. 3-5, Nov. 5, 2007 (Nov. 5, 2007), pp. 991-1003, XPO22453331, ISSN: 0022-460X, DOI: 10.1016/J.JSV.2007.09.041 2. Technical Background.
Hongmei Liu et al: "Helicopter Rotor Balance Admustment using GRNN Neural Network and Genetic Algorithm", Intelligent Systems, 2009. GCIS '09. WRI Global Congress on, IEEE, Piscataway, NJ, USA, May 19, 2009 (May 19, 2009), pp. 101-106, XPO31516198, ISBN: 978-0-7695-3571-5 pp. 103-104; figures 1,3.
Wang S et al: "A Probability-Based Approach to Helicopter Rotor Tuning", Journal of the American Helicopter Society, American Helicopter Society, Alexandria, VA, US, vol. 50, No. 1, Jan. 1, 2005 (Jan. 1, 2005), pp. 56-64, XPO01222952, ISSN: 002-8711, DOI: 10.4050/1.3092843 p. 62.
Jongsoo Lee et al: "Parallel genetic algorithm implementation in multidisciplinary rotor blade design", Journal of Aircraft, vol. 33, No. 5, Sep. 1, 1996 (Sep. 1, 1996), pp. 962-969, XPO55172248, ISSN: 0021-8669, DOI: 10.2514/3.47042 p. 1, col. 2.
Search Report and Opinion issued by the European Patent Office on Feb. 27, 2015 for European Patent Application 14188204.

\* cited by examiner

SYSTEMS AND METHODS FOR TRACK AND BALANCE VISUALIZATION

CROSS-REFERENCE TO RELATED APPLICATIONS

This application claims the benefit of priority to U.S. Provisional Patent Application No. No. 61/888,748 filed Oct. 9, 2013 which is incorporated by reference herein in its entirety.

BACKGROUND OF THE INVENTION

1. Field of the Invention

The present disclosure relates to rotary blades, and more particularly to track and balance adjustments to rotary blades.

2. Description of Related Art

Aircraft rotary blades are subject to balance and track variation that subjects the vehicle to vibration. Balance relates to the relative weight of the blades at the hub while track relates to the tendency of a blade to depart from the path of its predecessor during rotation. Track and balance can change over time owing to blades changes over time, such as mass or aerodynamic changes due to wear and erosion or stiffness change due to repeated loading cycles during service. Blade track and balance can also change as a result of maintenance or service, such as when one or more blades of a blade set are replaced. As a result, vibration associated with track and balance error can reach a point where aircraft performance degrades or crew fatigue from exposure to vibration becomes excessive. Structural damage to the aircraft can also result if corrections are not made.

Track and balance problems are typically addressed through a rotor trimming process. Rotor trimming involves physically adjusting one or more components associated with the blade that influence blade track or balance, such as weights, tabs or pitch control rods. Since these components cooperate to define track and balance for a blade, adjustments are interdependent as the performance change resultant from any one adjustment is influenced by the settings of the others. For that reason, rotor trimming typically involves the use of an analysis tool that defines a set of adjustments for the track and balance condition of a given aircraft.

Because one type of adjustment can be more complex, time consuming, or influential than another, conventional analysis tools allow the user to pre-select a subset of adjustments prior to the analysis tool generating an adjustment solution. While this provides the user flexibility, such as improving performance in view of a pre-defined period within which the aircraft has been made available for maintenance, it can also obscure the tradeoffs associated with constraining the adjustment solution to a subset of the otherwise available adjustment alternatives. Different types of adjustments can cause change performance in different ways. Consequently, it can be difficult for the user to understand how a given constraint effects the expected improvement in comparison to an unconstrained and/or differently constrained adjustment solution.

Such conventional methods and systems have generally been considered satisfactory for their intended purpose. However, there is still a need in the art for methods and systems for visualizing alternative adjustments for changing aircraft rotor track and balance performance. The present disclosure provides a solution for these problems.

SUMMARY OF THE INVENTION

A method of visualizing track and balance includes receiving data indicating track and balance of a rotary blade and receiving a constraint. A first performance level based on the data is determined. A second performance level based on the data and the constraint is determined. The first and second performance levels are displayed on a display unit for visualizing differences between the first and second performance levels.

In certain embodiments, the first performance can be a level of track and balance performance of a blade for a rotary wing aircraft. The first performance level can be a track and balance indicative of the current condition of a rotary blade of interest. The second performance level can be goal track and balance of the rotary blade of interest. Alternatively, it can be an unconstrained expected performance level of the blade. It is contemplated that the second performance level can be a constrained expected performance level of the blade.

In accordance with certain embodiments, the first performance can be associated with a constraint to a track and balance adjustment solution. The second performance level can be an expected performance level associated with a different constraint or constraint set for the rotary blade of interest. For example, the differently constrained expected performance level can exclude the received constraint. The differently constrained expected performance level can be within a performance goal of the rotary blade. Determining can include normalizing the first and second performance levels with respect to a predetermined goal performance for the rotary blade of interest.

It is contemplated that, in certain embodiments, displaying the first and second performance level can include displaying the track and balance performance for two or more flight regimes. The displayed performance levels can be in a polar coordinate system where respective performance levels are indicated by distance from the center of the polar coordinate system and each flight regime shares a common angular offset. Displaying can include displaying first and second track performance level for each of a plurality of rotary blades with respect to a flat track. Displaying can also include displaying first and second performance levels independently for each of two or more sensors. It is contemplated displaying can include displaying first and second performance levels on a polar chart such that distance from the center corresponds to vibration magnitude and angle corresponds to location in a rotation disk of the rotary blade.

A system for visualizing track and balance of a rotary blade is also provided. The system includes a processor operably connected to a memory and a display unit. The memory has instructions recorded thereon that, when read by the processor, cause the processor to receive data indicative of track and balance performance of a rotary blade and receive a constraint. The instructions cause the processor to determine a first performance level based on the data, determine a second performance level based on the constraint and the data, and determine a third performance level based on the data and which is less than the second performance level. The instructions also cause the processor to display on the display unit each of the first, second and third performance levels for visualizing performance differences between the first, second and third performance levels. The display includes a display of the first, second and third performance levels in a polar coordinate system where distance from the center of the polar coordinate system corresponds to performance and angle corresponds to flight regime. These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 2:
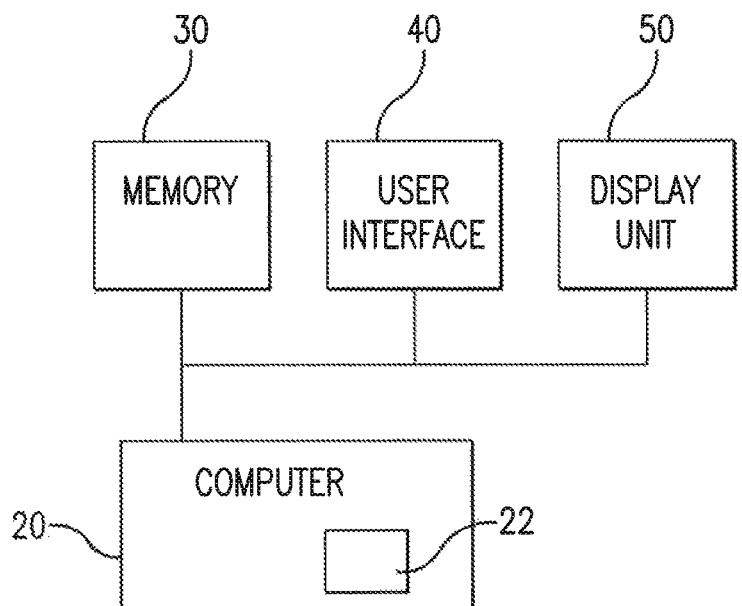
FIG. 2 is schematic diagram of a system for visualizing track and balance, showing the components of the system.

Reference will now be made to the drawings wherein like reference numerals identify similar structural features or aspects of the subject disclosure. For purposes of explanation and illustration, and not limitation, a partial view of an exemplary embodiment of a visualization system in accordance with the disclosure is shown in FIG. 2 and is designated generally by reference character 10. Other embodiments of systems and methods of track and balance performance visualization in accordance with the disclosure, or aspects thereof, are provided in FIGS. 3-8, as will be described. The systems and methods described herein can be used for fixed and rotary wing vehicles, such as helicopters for example.

Figure 1:
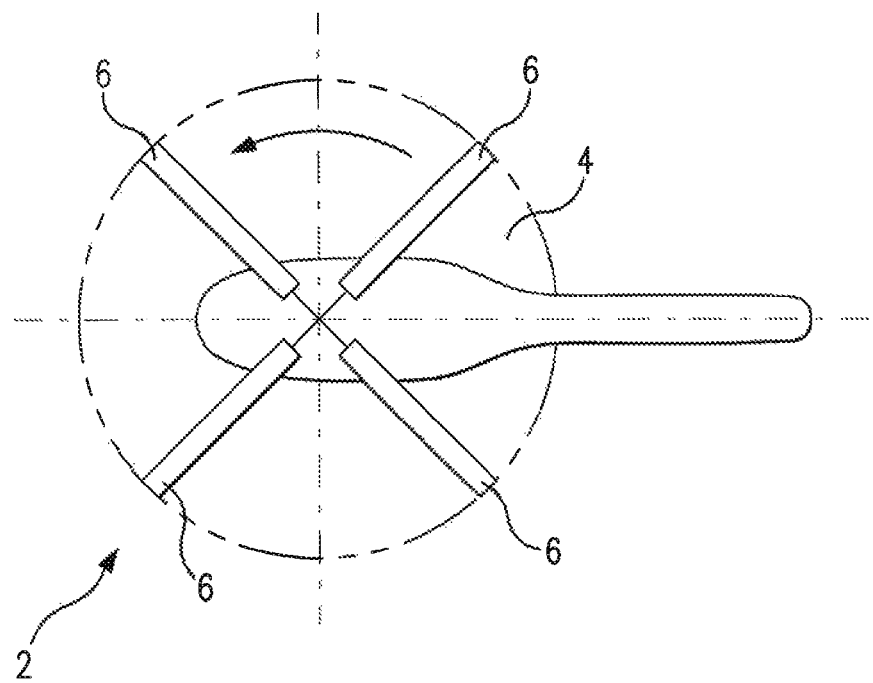
FIG. 1 is a schematic plan view of a rotary wing aircraft, showing rotary blades of the aircraft.

Referring to FIG. 1, a helicopter 2 is shown having a rotor disk 4 with a plurality of blades 6. One of the blades 6 may be selected as a reference blade and each of the other blades may be assigned a blade number starting with zero for the reference blade and increasing by one in the direction of rotation. For example, for the four-blade rotor 4 shown in FIG. 1, the blades may be numbered zero through three. In addition, in some embodiments, the blades 6 may be identified by assigning a unique color to each blade.

Rotation of the blades 6 generates vibrations in the helicopter 2. The vibrations may be measured by sensors like accelerometers arranged within the aircraft. Generally, vibration associated with rotary blade track and balance is addressed through a rotor trimming aircraft maintenance procedure. Rotor trimming involves one or more adjustments to one or more adjustment devices associated with a given rotor blade. This can entail a sequence of interdependent mechanical adjustments to one or more blades of the blade set, such as changes to the weight of blades at the hub, adjustment to one or more tabs arranged along respective lengths of the blades, and/or adjustment to the pitch control rod throw for one or more of the blades for example. Conventional rotor trimming procedures include accessing the current state of the track and balance of a blade set by acquiring data, analyzing the data using an analysis tool to generate an adjustment strategy, executing the adjustments, acquiring data indicative of performance after adjustment(s), and analyzing the data afterwards to access performance. As will be appreciated by those skilled in the art, conventional rotor trimming processes can involve multiple iterations of adjustments. As will be appreciated, one or both of rotary blade track and balance adjustments can be analyzed using the systems and methods described herein.

With reference to FIG. 2, a system 10 for visualizing track and balance of a rotary blade is also provided. System 10 includes a computer 20 having a processor 22, a memory 30, a user interface 40, and a display unit 50. Processor 22 is operably connected to each of memory 30, user interface 40, and display unit 50, and is configured and adapted to undertake the operations described below. User interface 40 is configured and adapted to receive user input and provide the input to processor 22. Display unit 50 is configured and adapted to display information as described below, such as for visualization of rotor track and balance performance of an aircraft.

Figure 3:
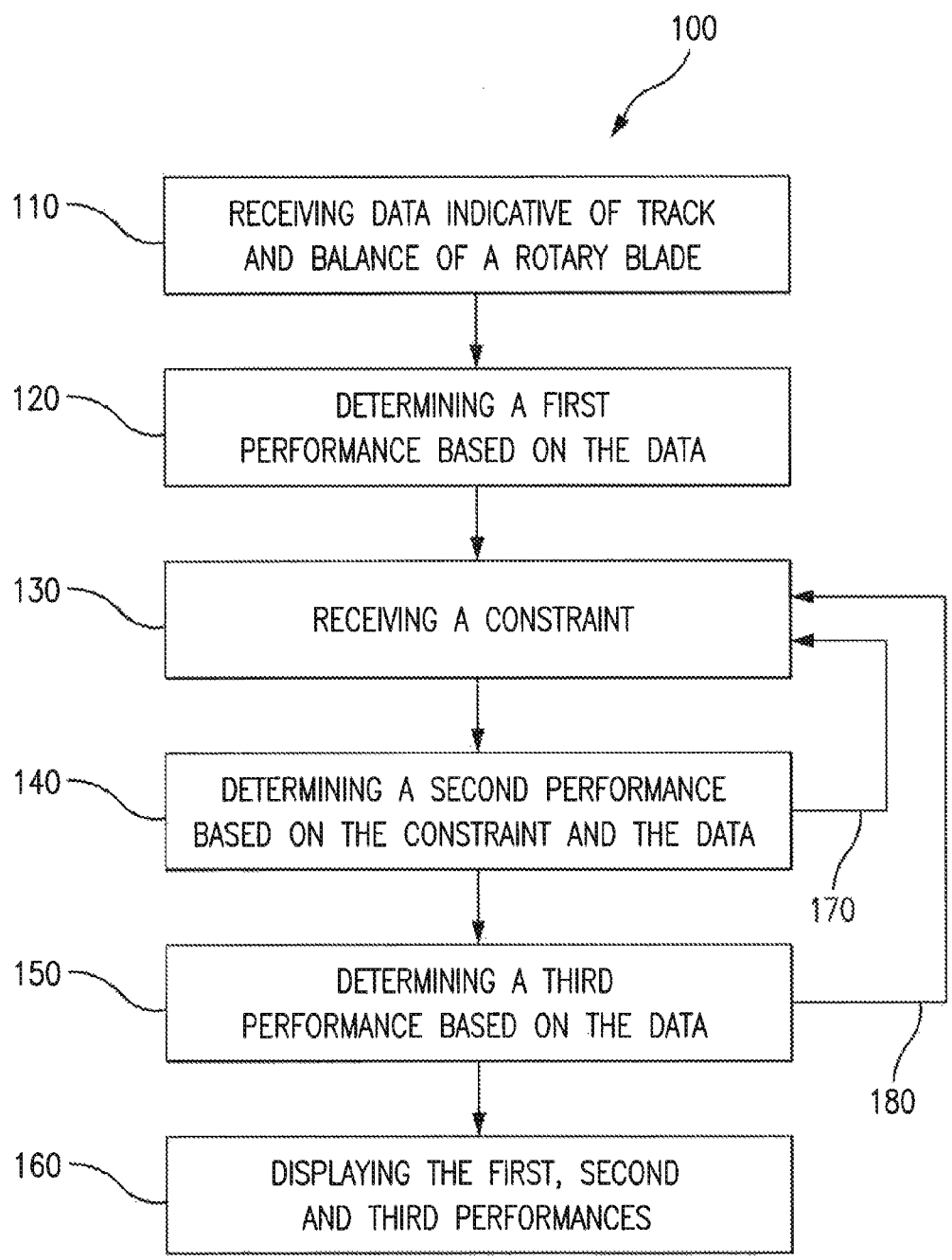
FIG. 3 is flowchart of a method for visualizing track and balance of a rotary blade, showing operations of the method.

With reference to FIG. 3, method 100 of visualizing track and balance is shown including a set of operations. Method 100 includes operations 110, 120, 130, 140, 150 and 160. Operation 110 includes receiving data indicating track and balance of a rotary blade. The received data can be indicative of the current track and balance performance of an aircraft. The received data can also include a predetermined goal for track and balance performance, such as in the operator specification for a specific model of helicopter for example. Acquiring data typically involves accessing track and balance in one or more flight regimes. Exemplary flight regimes can include a ground mode, a hover mode and one or more forward flight at speed modes. Data can be acquired in each flight regime using one or more accelerometers in conjunction with a shaft position reference sensor. Accelerometers can be positioned on the blades and at other locations of interest, such as within the aircraft cabin or on structures sensitive to vibratory impulses. Data can also be acquired optically, such as by monitoring respective positions of blade tips passing through a given angular position in the blade disk using one or more optical sensors.

Operation 120 includes determining a first performance level based on the received data. The first performance level can be representative of an actual condition of an aircraft. The first performance level can also be a 'best ride' assessment of the data, for example illustrating the best possible track and balance possible given the performance indicated by the data.

Determining performance generally involves analyzing the data using an algorithm to objectively assess track and balance performance. Typically, such analysis is performed using an analysis tool incorporating one or more analysis modules such as ground station aircraft support software like Pulse™ ground station software for aircraft health utilization and monitoring software, available from Simmonds Precision Products Inc., of Vergennes, Vt. Such analysis modules are described in, for example, in U.S. Pat. Nos.

6,567,757, 6,574,572, 7,512,463, 6,950,763, 7,272, 513 as well as "IMD HUMS Rotor Track and Balance Techniques", Bechhoefer et al., Aerospace Conference 2003 Proceedings, 2003 IEEE, Volume 7, Mar. 8-15, 2003 Page(s): 3205-3211, ISBN 0-78037651-X/03, each of which is incorporated herein by reference in its entirety.

As will be appreciated by those skilled in the art, executing trimming adjustments can involve any one of host of adjustments. One type of adjustment can be more readily made than other types or have a greater degree of influence in achieving a desired or predicted effect. This means that certain types of adjustments can require less time to execute or are more likely to achieve a predicted performance change than other adjustment types.

Since a given adjustment can also be interdependent with other adjustments such that making one adjustment implies making other adjustments during the trimming event. Rotor trimming can therefore require a succession of adjustments to achieve a desired performance. This interdependence can introduce difficulty with trial and error methods of rotor trimming as a first adjustment may be thrown out of kilter by a subsequent adjustment in a preselected adjustment strategy. Repetitive adjustments may be required in order for the adjustments to converge to an acceptable state. As will be appreciated by those skilled in the art, individual adjustment types can differ in complexity or certainty of expected performance change, have interdependencies with other adjustment settings, or require different levels of user proficiency for efficient execution. User interface 50 is configured to receive a constraint input, such as excluding blade weight changes, excluding pitch control rod changes, excluding tab changes, and/or excluding blade tip weight changes from a determined set of track and balance adjustments.

Operation 130 includes receiving a constraint. Receiving a constraint typically includes providing an input to the algorithm limiting the possible adjustment or combination of adjustments output by the algorithm. For example, a user can input a constraint at the user interface by ticking a box next to an adjustment type, such as pitch rod control. In conventional adjustment algorithms, output will not include pitch rod adjustments irrespective of whether such adjustment would improve the expected performance of an aircraft of interest. While this can be appropriate under certain circumstances, such as when time, tools or trained personnel are unavailable to perform a specific type of track and balance adjustment, it can also allow a user to constrain themselves into a corner—and possibly prevent reaching goal performance with any adjustment generated given the input constraint.

With continued reference to FIG. 3, operation 140 includes determining a second performance level based on the data and the constraint. Operation 140 is similar to operation 120, and additionally includes the above-described user-defined constraint. As a result, the expected track and balance performance associated with operation 140 will be different—and possibly offer smaller reductions in vibration compared to other alternatives. In conventional algorithms, this may not be readily apparent to the user. Differences between first performance level and second performance level are of interest as they reflect the cost in performance terms of excluding certain types of adjustments by constraining the adjustment solution produced by the algorithm.

Operation 150 includes determining a third performance level based on the data. Operation 150 is similar to operations 120 and 140, and is a differently constrained performance level than operation 120 and operation 140. It does not contain the constraint received in operation 130, but can include at least one other constraint selected by the algorithm for purposes of determining a set of adjustments to achieve performance that is within a predetermined goal, for example. The constraints can be included based upon a preference list received from a user. It can include the same number, fewer, or a greater number of adjustments as associated with operation 140. The received constraint can be iteratively adjusted followed by corresponding iterations 170 and 180 of determining first, second and third performance levels.

Operation 160 includes displaying a visualization of performance levels. The visualization includes two or more performance levels as may be suitable for a given application, and can be based on input received from user interface 40. FIGS. 4-8 show example visualizations of track and balance performance levels.

Figure 4:
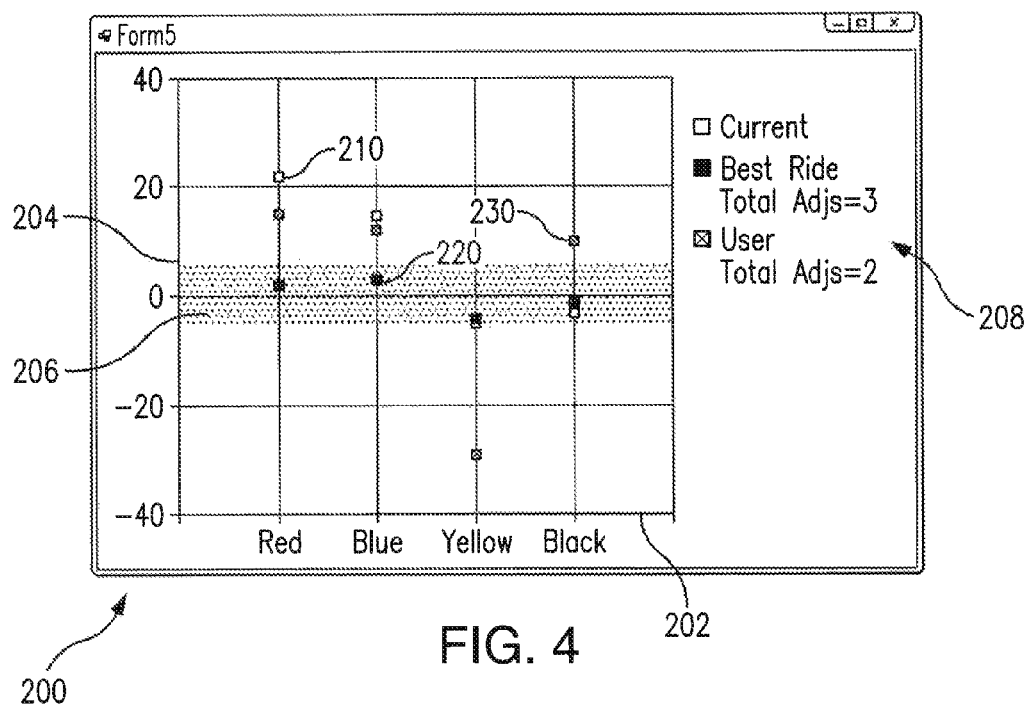
FIG. 4 is an embodiment of a visualization generated with the method of FIG. 3, showing blade track performance for three aircraft conditions.

With reference to FIG. 4, a visualization 200 including blade track performance is shown. Visualization 200 includes individual blades on an ordinate axis 202 (x-axis) and a quantification of tracking error on the coordinate axis 204 (y-axis). A horizontally extending limit area 206 provides context for the data graphically. In the illustrated embodiment, tracking data for four blades, e.g. red, blue, yellow and black) is shown. As will be appreciated, visualization can include any number of blades as suitable for a given aircraft.

Visualization 200 includes a first performance level 210, a second performance level 220, and a third performance level 230. First performance level 210 illustrates performance of an aircraft in a condition of interest. The condition of interest can represent the current condition of an aircraft, and in relation to limit area 206, shows three of the four blades exhibiting tracking error outside of goal. Second performance level 220 illustrates unconstrained expected performance, and shows each of the four blades within goal. Third performance level 230 illustrates three of the four blades outside of goal, albeit with different blades being outside of goal and the relative amount of tracking error being different. Notably, visualization 200 provides a reference area 208 indicating the number of adjustments required to achieve the second and third expected performance levels. Visualization 200 therefore makes clear that the received constraint precludes a within goal adjustment trimming event, and that within goal adjustment is possible with a third adjustment.

Figure 5:
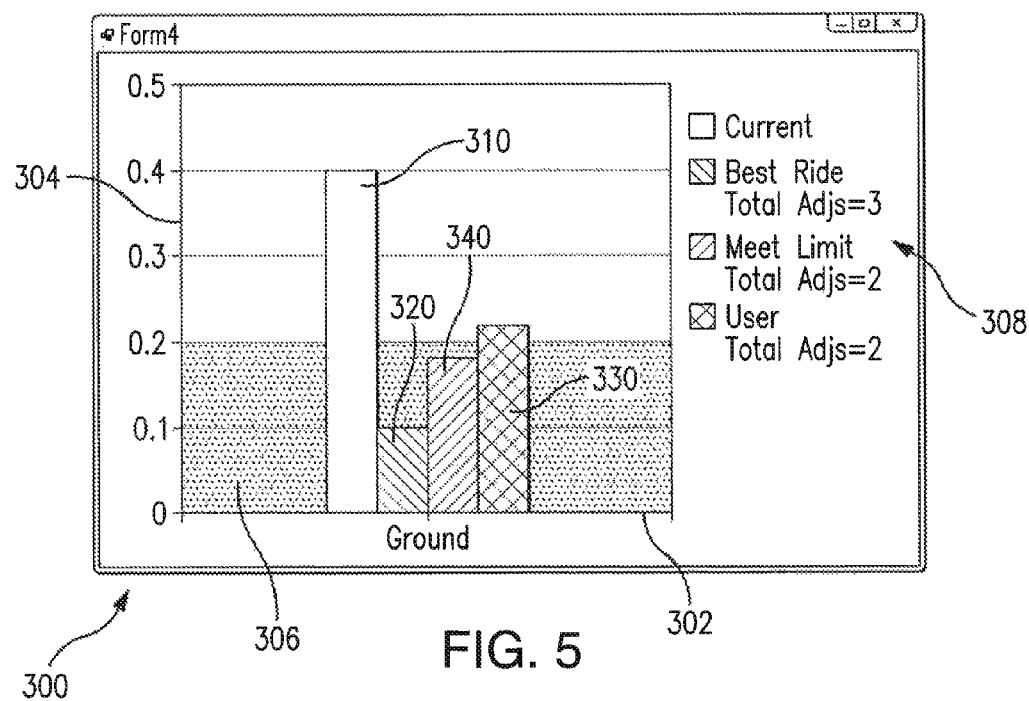
FIG. 5 is another embodiment of a visualization generated with the method of FIG. 3, showing vibration performance for four aircraft conditions.

With reference to FIG. 5, a visualization 300 is shown. Visualization 300 includes individual blades on an ordinate axis 302 (x-axis) and a quantification of vibration error (i.e. accelerometer data) on the coordinate axis 304 (y-axis). A horizontally extending limit area 306 provides a graphical context for the data. A reference area 308 identifies illustrated performance levels and correlates expected performance levels with a quantification of expected difficulty of associated adjustment strategy.

Visualization 300 also includes a first performance level 310, a second performance level 320, a third performance level 330, and a fourth performance level; 340. First performance level 310 illustrates the current vibration performance of an aircraft. Second performance level 320 illustrates expected unconstrained performance, e.g. optimized performance in view of the current aircraft condition. Third performance level 330 illustrates expected constrained performance, e.g. an expected performance level achievable through adjustment in view of a received constraint. Fourth performance level 340 illustrates differently constrained expected performance level, e.g. expected performance including the selected constraint and including another unselected constraint.

In the illustrated embodiment, visualization 300 shows that (a) aircraft performance is presently outside the predetermined goal and (b) that the performance of the rotary blade of interest can be brought to within the predetermined goal through rotor trimming. Visualization 300 also shows that (c) expected performance will not reach the predetermined goal with the selected constraint, but that (d) expected performance can be reached using a different constraint selection. Notably, the differently constrained solution is of similar difficulty as the constrained solution as indicated through the number of adjustments necessary.

Figure 6:
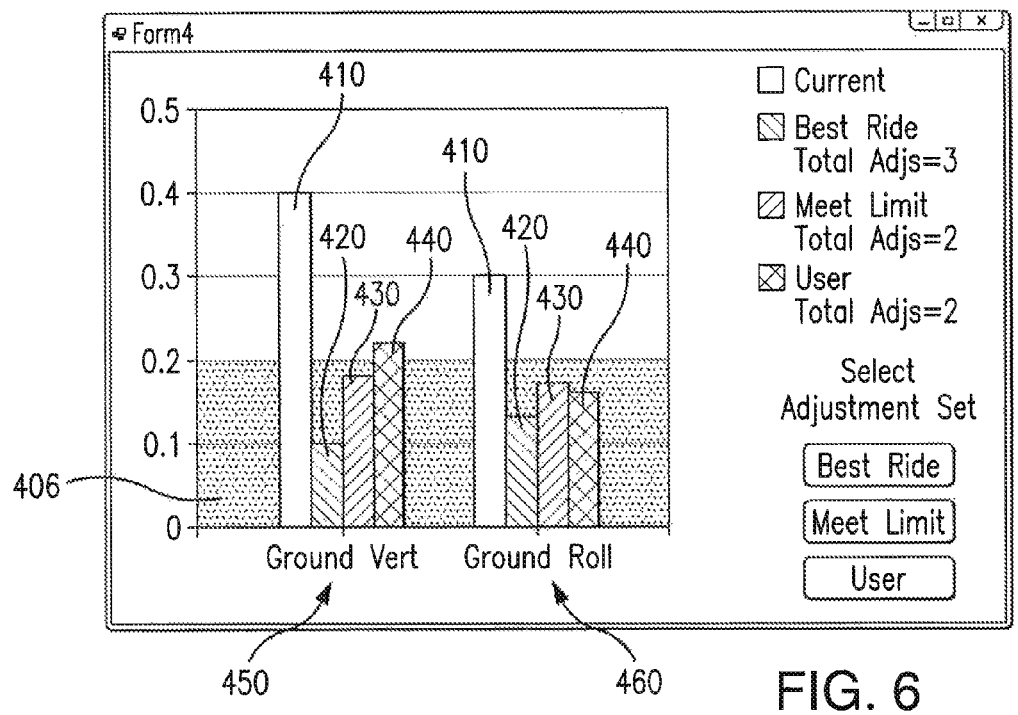
FIG. 6 is still another embodiment of a visualization generated with the method of FIG. 3, showing vibration performance for four aircraft conditions from two sensors.

With reference to FIG. 6, a visualization 400 is shown. Visualization 400 is similar to visualization 300, and additionally shows first, second, third and fourth performance levels 410, 420, 430, 440 in a plurality of flight regimes 450 and 460 (e.g. ground and hover). A horizontally extending limit area 406 provides a graphical context for the data, e.g. a within goal or specification reference line bounding a chart portion with a stippled portion showing within goal or specification limits. As will be appreciated, visualization 400 can also illustrate performance levels using data from two sensors in a single flight regime.

Figure 7:
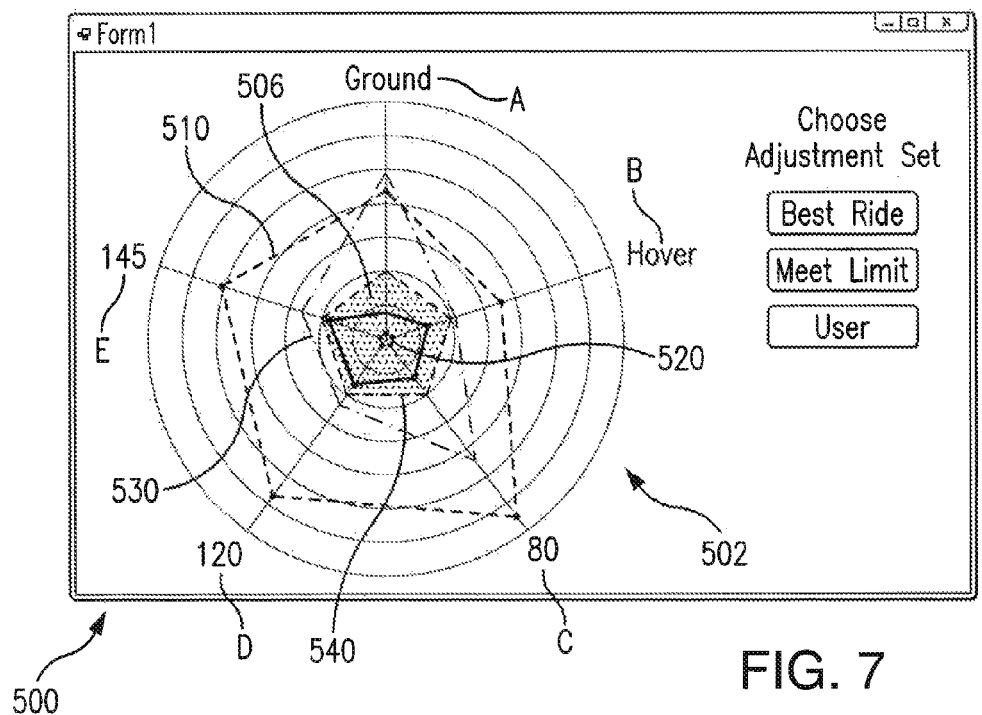
FIG. 7 is yet another embodiment of a visualization generated with the method of FIG. 3, showing vibration performance in five flight regimes for four aircraft adjustment conditions.

With reference to FIG. 7, a visualization 500 is shown. Visualization 500 includes first, second, third, and fourth performance levels 510, 520, 530 and 540 similar to those described above. A horizontally extending limit area 506 provides a graphical context for the data, e.g. a within goal or specification reference line bounding a chart portion with a stippled portion showing within goal or specification limits. Visualization 500 presents performance levels 510, 520, 530 and 540 with polar coordinates, common angular offsets corresponding to individual flight regime and distance from the plot center 504 corresponding to vibration level in the flight regime. Line segments linking respective vibration levels associate vibration levels into one of performance levels 501, 520, 530 or 540.

Vibration levels are presented on concentric circles with radii having integer multiples of goal performance. This presents the data in a normalized to goal form for ease of qualitative assessment. In the illustrated exemplary embodiment five flight regimes A, B, C, D and E are shown, i.e. ground, hover, 80-knot forward flight, 120-knot forward flight, and 145-knot forward flight. As will be appreciated, other numbers and regimes are possible and within the scope of the present disclosure. This presents an intuitive visualization of the current state of the rotor blades and predicted outcomes for available solution strategies. The visualization enables a user to choose a solution strategy that best meets their objectives in relation to vibration magnitude, number of adjustments to achieve vibration thresholds or goals, or incorporating user-imposed constraints to the solution sets. It also avoids the need to reviews tables of data to assess the expected performance level of a solution set.

Figure 8:
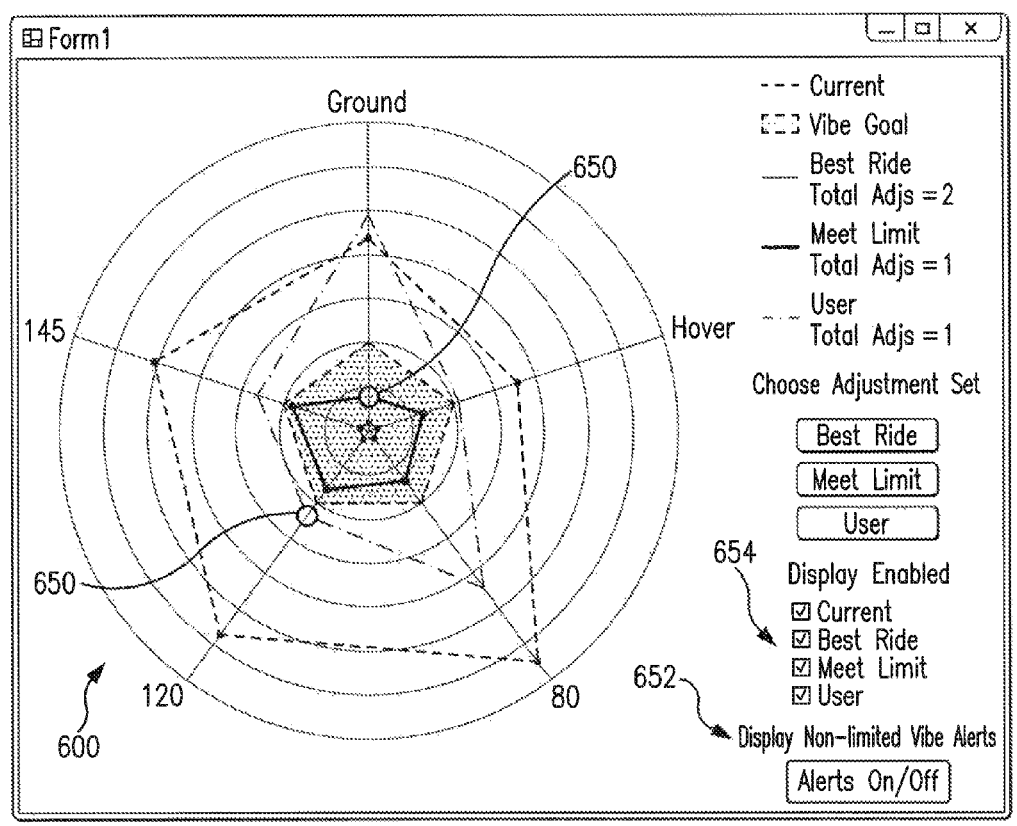
FIG. 8 is a further embodiment of a visualization generated with the method of FIG. 3, showing predicted vibration performance independent of a vibration threshold and associated with an implied target value.

With reference to FIG. 8, a visualization 600 is shown. Visualization 600 is similar to visualization 500, and additionally includes a flag 650. Flag 650 appears on visualization 600 in association with a flight regime and performance level combination, and illustrates a further comparison of predicted performance measures independent of a vibration threshold or goal and relative to an implied target value. The implied target value can be rule based, such as percentage increase or ratio increase in predicted vibration level or other value related to explicit threshold or goals.

When comparison of predicted performance indicates that predicted performance exceeds the implied target value, flag 650 appears with greater size, e.g. with exaggerated size, such as a circle with an area greater than that of performance levels that do not exceed the implied target level. The implied target value can be a relative level of vibration increase that is within vibration goal. The size can be proportioned to indicate the degree to which that implied target level is exceeded, for example a larger flag area indicating that a predicated performance exceeds larger value relative to an implied target value goal performance level for example. This can provide an indication that further investigation may be warranted prior to executing a determined set of adjustments to an aircraft.

Flag 650 can also include optical indicia, such as a colored fill (e.g. yellow, red), or with a color scale indicating the level to which the performance exceeds the implied target level. Embodiments of visualizations having flag 650 visualizes predicted performances with changes of interest, such as a flight regime in a given performance level with worse performance (deterioration) relative to another performance level (baseline). As illustrated, flag visualization 650 can be suppressed by a portion 652 of visualization 650 configured to receive a user input, such as a check box for example. As indicated with user interface 654, individual performance levels can also be suppressed by a portion 654 of visualization 650 configured to receive a user input through a check box. The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the subject disclosure.

What is claimed is:

1. A method of adjusting track and balance of a rotary blade, comprising:
   receiving data indicating track and balance of a rotary blade of interest;
   determining a first performance level based on the received data, wherein the first performance level is indicative of track and balance performance of the rotary blade of interest;
   receiving a constraint, wherein the constraint includes a one or more user-selected trimming adjustment for exclusion from a constrained adjustment solution provided by the adjustment algorithm;
   determining a second performance level based on the received constraint and the received data, wherein the second performance level is representative of expected track and balance performance by trimming the rotary blade of interest according to a constrained adjustment solution provided by the adjustment algorithm;
   displaying on a display unit the first and second performance levels for visualizing differences between the first and second performance levels; and
   trimming the rotary blade using the constrained adjustment solution.

2. A method as recited in claim 1, wherein the first performance level is indicative of track and balance of a helicopter rotary blade.

3. A method as recited in claim 1, wherein the first performance level is indicative of a current track and balance condition of the rotary blade of interest.

4. A method as recited in claim 1, wherein the second performance level is unconstrained expected track and balance performance level of the rotary blade of interest.

5. A method as recited in claim 1, wherein the second performance level is a predetermined track and balance goal performance of the rotary blade of interest.

6. A method as recited in claim 1, wherein the second performance level is a differently constrained expected performance level of the rotary blade of interest.

7. A method as recited in claim 6, wherein the differently constrained expected performance level excludes the received constraint.

8. A method as recited in claim 6, wherein the differently constrained expected performance level is within a track and balance goal performance level of the rotary blade of interest.

9. A method as recited in claim 1, wherein the determining includes normalizing first and second performance levels to a goal performance level of the rotary blade of interest.

10. A method as recited in claim 1, wherein the displaying includes displaying the first and second performance levels of at least one of track and balance in two or more flight regimes.

11. A method as recited in claim 10, wherein the displaying includes displaying first and second performance levels in a polar coordinate system, wherein distance from the center of the system corresponds to performance level and angle corresponds to the flight regime.

12. A method as recited in claim 1, wherein displaying includes displaying first and second track performance levels for each of a plurality of rotary blades with respect to a flat track.

13. A method as recited in claim 1, wherein displaying includes displaying first and second performance levels separately for each of two or more sensors.

14. A method as recited in claim 1, wherein displaying includes displaying a performance flag, the performance flag being associated with a flight regime and performance level and having an area relating performance to an implied target value.

15. A system for adjusting track and balance of a rotary blade, comprising:
a processor operably connected to a memory and a display unit, wherein the memory has instructions recorded thereon that, when read by the processor, cause the processor to:
receive data indicative of track and balance performance of a rotary blade;
determine a first performance level based on the data, wherein the first performance level is indicative of track and balance performance of the rotary blade of interest;
receive a constraint, wherein the constraint includes a one or more user-selected trimming adjustment for exclusion from a constrained adjustment solution provided by the adjustment algorithm;
determine a second performance level based on the constraint and the data, wherein the second performance level is representative of expected track and balance performance by trimming the rotary blade of interest according to a constrained adjustment solution provided by the adjustment algorithm;
determine a third performance level based level on the data, wherein the third performance level is differently constrained than the second performance level;
display on the display unit the first, second and third performance levels for visualizing performance differences between the first, second and third performance levels,
wherein the display includes a display of the first, second, and third performance levels in a polar coordinate system where distance from the center of the system corresponds to performance level and angle corresponds to flight regime; and
providing the constrained adjustment solution for trimming the rotary blade.

16. A method of adjusting track and balance of a rotary blade, comprising:
receiving data indicating track and balance of a rotary blade of interest;
determining a first performance level based on the received data, wherein the first performance level is indicative of unconstrained track and balance performance of the rotary blade of interest using an unconstrained adjustment solution provided by an adjustment algorithm;
receiving a constraint, wherein the constraint includes a one or more user-selected trimming adjustment for exclusion from a constrained adjustment solution provided by the adjustment algorithm;
determining a second performance level based on the received constraint and the received data, wherein the second performance level is representative of expected track and balance performance following trimming the rotary blade according to a constrained adjustment solution;
displaying on a display unit the first and second performance levels for visualizing differences between the first and second performance levels; and
trimming the rotary blade using the constrained adjustment solution, wherein the second performance level indicates a smaller reduction in vibration than the first performance level.

* * * * *